United States Patent [19]
Selby

[11] 3,734,529
[45] May 22, 1973

[54] TRAILER FRAME
[76] Inventor: James R. Selby, 1028 East F, Casper, Wyo. 82601
[22] Filed: Mar. 25, 1971
[21] Appl. No.: 127,957

[52] U.S. Cl. ............................. 280/80 B, 280/106 T
[51] Int. Cl. .............................................. B62d 53/06
[58] Field of Search .................... 280/405, 406, 407, 280/81 R, 80 B, 34 T, 106 T; 296/23 R

[56] References Cited
UNITED STATES PATENTS

| | | | |
|---|---|---|---|
| 3,455,474 | 7/1969 | Truncali | 214/505 |
| 2,717,707 | 9/1955 | Martin | 280/80 B |
| 1,265,705 | 5/1918 | Litchfield | 280/80 B |
| 2,433,268 | 12/1947 | Fellabaum | 280/81 R |
| 3,239,274 | 3/1966 | Weiss | 280/81 R |
| 3,231,121 | 1/1966 | Powell | 280/106 T X |

Primary Examiner—Kenneth H. Betts
Attorney—Cushman, Darby & Cushman

[57] ABSTRACT

A trailer frame structure is provided for mobile homes and consists of an outer, generally rectangular, frame having at its front end coupling means for attaching the trailer to a vehicle and an inner, generally rectangular, frame which is pivotally mounted intermediate its ends between the outer frame adjacent the rear end thereof whereby the inner frame is capable of pivoting about a generally horizontal axis. A wheel bogie is attached to one of the frames adjacent the pivot axis; the rear end of the inner frame extends beyond the rear end of the outer frame so that the front end of the inner frame will intersect the outer frame at a point intermediate the outer frames ends; adjustable abutment elements are provided on the forward end of the inner frame for contacting the underside of the outer frame when the inner frame pivots about its axis in response to the weight of a load on the rear end of the inner frame.

6 Claims, 3 Drawing Figures

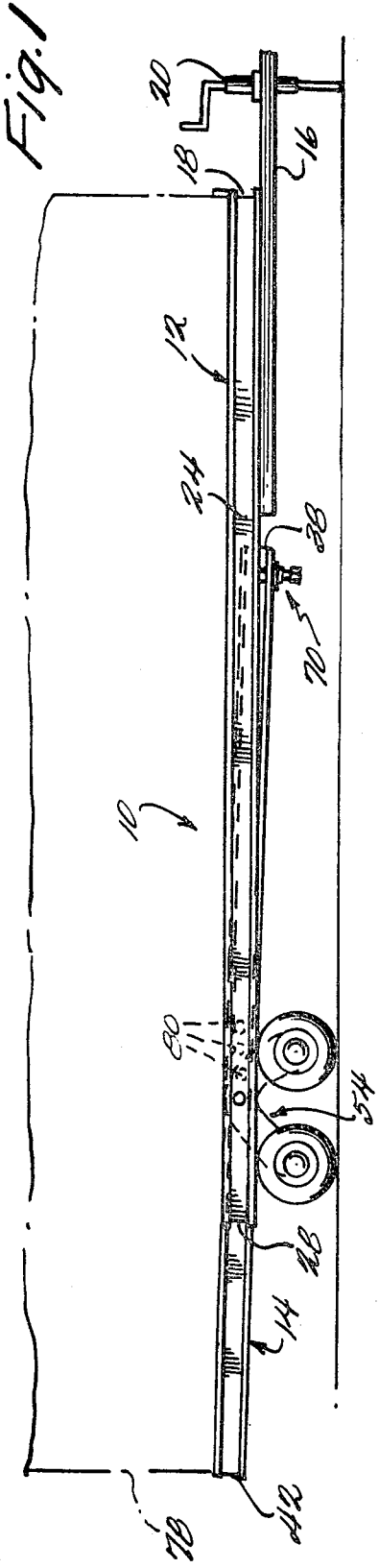
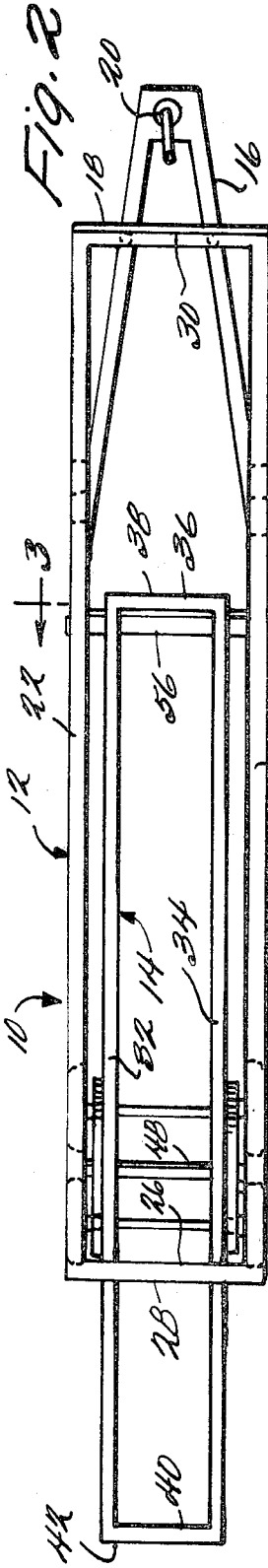
PATENTED MAY 22 1973 3,734,529
INVENTOR
JAMES R. SELBY
BY Cushman, Darby & Cushman
ATTORNEYS

TRAILER FRAME

The present invention relates to improvements in trailer structures and more particularly, to an improved trailer frame support for elongated loads such as mobile homes or the like.

BACKGROUND OF THE INVENTION

In the manufacture of mobile homes, it has been the practice to construct a base frame to which one or more axle assemblies are attached in tandem and on top of which the dwelling structure is subsequently erected. In order to increase their appeal to consumers, manufacturers have endeavored to construct such mobile dwellings so that they will closely resemble static apartment structures. To this end, designers have attempted to incorporate a number of features, such as sound proofing, additional insulation and plumbing as well as various electrical appliances including air conditioning and dishwashers into the mobile home structures. As a consequence, the overall weight of the mobile dwelling has been increased which has necessitated the strengthening of the base frame structure which has, in turn, resulted in increased costs. In trailers where the dwelling is constructed on a frame having a coupling tongue at its front end and a single set of wheels adjacent its rear end, the base frames have had a tendency to bow downwardly at a point intermediate its front and rear ends after the trailer has been in use and particularly where the trailer is towed over undulating terrain. Bowing of the base frame results in deformation of the floor of the dwelling often rendering the closing and opening of windows and doors difficult if not impossible.

To overcome this deficiency, manufacturers resorted to the cumbersome and time-consuming practice of bowing the base frame in an opposite direction at the point at which the greatest stress is imparted to the frame in order to compensate for such stress in the course of the use of the trailer. Generally, such compensating bowing has been implemented by cutting a V-shaped section from each of the side beams of a trailer structure and then bending the frame and welding plates across the cutout portions. Such a solution, however, suffers from the obvious disadvantage that as the dwelling structure is erected above the frame, compensating and often hypothetical allowances must be made for the various measurements such as for the window frames, door jambs and wall placements which will vary in the course of the construction of the dwelling as the weight upon the frame increases. Since the exact calculation and distribution of the resulting weight of the dwelling is often impossible to determine, the degree to which the base frame must be bowed upwardly is correspondingly difficult to determine so that, as a result, floors of the dwelling are often uneven or become so during the use of the trailer structure.

The present invention provides an improved frame structure for a trailer which will compensate for the stresses tending to cause the frame of the trailer to bow downwardly and which can be more easily and less expensively manufactured than the frame structures that have been previously utilized.

SUMMARY OF THE INVENTION

In one embodiment, the trailer structure of the present invention consists of an outer frame consisting of two laterally spaced side beams extending from the front end of the frame towards the rear end thereof. An elongated inner frame is mounted intermediate its ends adjacent the rear end of the outer frame so as to be able to pivot about an axis lying in the plane of the outer frame. The forward end of the inner frame is provided with spaced surfaces for contacting the underside of the side beams of the outer frame when the forward end of the inner frame is pivoted upwardly in response to the weight of a load positioned on the rear end of the inner frame. A wheel bogie assembly, in one embodiment, is connected to the outer frame at a point adjacent to the pivot axis. With this arrangement, an upwardly directed force will be transmitted to the side beams of the outer frame which is proportional to the weight of the load supported by the rear end of the inner frame. As a result, the bowing downwardly of the outer frame can be compensated for by regulating the weight of the load positioned over the rear end of the inner frame.

In the construction of a mobile home on the frame structure of the present invention, the floor of the dwelling may be laid out in a substantially horizontal plane extending from the rear end of the inner frame to the front end of the outer frame. By appropriately distributing the weight of the dwelling structure with respect to the pivot axis and by appropriately positioning the forward end of the inner frame with respect to the outer frame preferably at the point where bowing of the frame would normally occur, the weight of the trailer structure supported by the rear end of the inner frame can be employed to cause the inner frame to pivot to result in the application of an upwardly directed force to the underside of the side beams of the outer frame to cancel out the downwardly directed force which causes the bowing of these side beams. Subsequent to the completion of the construction of the trailer dwelling, of course, the forward end of the inner frame will be attached at its points of contact with the outer frame by suitable connectors to prevent any undesirable movement of the inner frame as the trailer is towed behind a vehicle.

A principal object of the present invention, therefore, is the provision of an improved trailer structure having adjustable means for compensating for forces tending to deform the frame structure of the trailer. Another object is the provision of a towable trailer structure which is capable of more evenly distributing the weight of a load carried on the trailer structure. A further object of the present invention resides in the provision of a trailer structure having an outer frame and an inner frame pivotally mounted for movement with respect to the outer frame, the frames being adapted to support a trailer apartment so that bowing down of the outer frame is prevented.

Other objects and attendant advantages will become apparent as further consideration is given to the following detailed description and accompanying drawings, in which:

BRIEF DESCRIPTION OF THE DRAWINGS

FIG. 1 is a side view in elevation of the trailer frame structure of the present invention;

FIG. 2 is a top plan view of the structure illustrated in FIG. 1; and

FIG. 3 is a view in cross section taken along lines 3—3 of FIG. 2.

DETAILED DESCRIPTION OF THE INVENTION

Referring now to the drawings wherein like numerals designate corresponding parts throughout the several views, there is illustrated in FIG. 1, the trailer frame structure of the present invention generally designated at 10 which consists of an outer frame 12 and an inner frame 14. A coupling tongue arrangement 16 is secured to the outer frame 12 and extends beyond the front end 18 of frame 12 and is provided with conventional coupling means schematically shown at 20 for attaching the trailer to a vehicle.

Referring now to FIG. 2, it can be seen that outer frame 12 consists of two side beams 22 and 24 which are maintained in spaced parallel relation by cross beam 26 at the rear end 28 of frame 12 and cross beam 30 at the front end 18 giving the outer frame 12 a generally rectangular configuration.

The inner frame 14 consists of side beams 32 and 34 maintained in a spaced parallel relation by a cross beam 36 at the front end 38 of frame 14 and a similar cross beam 40 at the rear end 42 of frame 14 so that the inner frame 14 will also have a generally rectangular configuration similar to that of frame 12 but with a smaller transverse width. The respective side beams and cross beams may be joined together by any suitable means such as bolts, rivets or the like.

As can be seen in FIG. 3, side beams 32 and 34 of inner frame 14 are provided with transversely aligned apertures 44 and 46 respectively through which a transverse pivot bar 48 extends. Suitable friction reducing bearing ring members as at 50 and 52 may be provided in the respective apertures 44 and 46 and through which the pivot bar 48 extends to reduce wear on the apertures. Pivot bar 48 extends beyond each of the side beams 32 and 34 through side beams 22 and 24 of the outer frame 12. A conventional wheel bogie assembly generally indicated at 54 is suitably journalled on pivot bar 48 adjacent each of its outer ends adjacent to the interior sides of the side beams 22 and 24 respectively. With this arrangement, inner frame 14 is capable of pivotal movement about the longitudinal axis of the pivot bar 48 with respect to the outer frame 12. Inner frame 14 is mounted on pivot bar 48 at a point intermediate its front end 38 and rear end 42 so that the rear end 42 will extend beyond the rear end 28 of the outer frame 12. Additionally, the front end 38 of the inner frame 14 will be disposed intermediate the ends 18 and 28 respectively of the outer frame 12. A transverse beam 56 is secured as by bolts at 58 and 60 to the underside of each of the side beams 32 and 34. The transverse beam 56 extends generally perpendicularly to the longitudinal axis of the side beams 22 and 24 of the outer frame 12 and extends beneath each of the downwardly facing surfaces 60 and 62 of side beams 22 and 24 respectively. At the outer ends 64 and 66 of the transverse beam 56, adjustable attachment means 68 and 70 are provided for connecting the transverse beam 56 to side beams 22 and 24 respectively. The attachment means 68 consists of a threaded bolt 72 positioned in a threaded aperture provided in the outer end 64 of beam 56 and is securely held in place by tightening nuts 74 and 75. The upper end of the bolt 72 is threaded into a nut like member 76 which is securely attached as by welding to surface 60. Attachment means 70 on end 66 of transverse beam 56 is identical to attachment means 68 and it will be understood that the foregoing description of attachment means 68 is fully applicable thereto. It should also be understood, that prior to the positioning of a load on the trailer 10, the attachment means 68 and 70 will be withdrawn so that the upwardly facing surfaces on the outer ends 64 and 66 of transverse beam 56 will contact the downwardly facing surfaces 60 and 62 (or the nut like member 76 when they are positioned on each of these surfaces) when the inner frame 14 is pivoted counterclockwise about pivot bar 48 as viewed in FIG. 1 so that the upwardly facing surfaces of the rear portion of the inner frame 14 extending beyond the end 28 of the outer frame 12 will lie as nearly as possible in the same horizontal plane as the upwardly facing surfaces of the outer frame 12.

Referring now to FIG. 1 again, the trailer structure 10 is shown as supporting a mobile home schematically designated in phantom lines by numeral 78 which extends from the front end 18 of the outer frame 12 to the rear end 42 of the inner frame 14. It will be understood, of course, that while the trailer structure of the present invention is disclosed as being suited for supporting a dwelling structure, it will be obvious that other types of elongated loads may be supported on and carried by the trailer frame 10. With load 78 positioned as illustrated in FIG. 1, that portion of the load which is supported by the rear end of the inner frame 14 which extends beyond the rear end 28 of the outer frame 12 will tend to rotate the inner frame 14 about the generally horizontally disposed pivot bar 48 counterclockwise as viewed in FIG. 1 so that the front end 38 of the inner frame 14 will move upwardly to bring the upwardly facing surfaces on the outer ends 64 and 66 of the beam 56 into engagement with downwardly facing surfaces 60 and 62 of the side beams 22 and 24 respectively of the outer frame 12. As a result, an upwardly directed force is imparted to the side beams 22 and 24 at the point of engagement which is proportional to the load supported on the rear portion of the inner frame 14. The points at which the side beams 22 and 24 are contacted should coincide with the points at which the side beams 22 and 24 experience the greatest vertical stress tending to bow them downwardly. Provision may be made for shifting the inner frame 14 transversely of the pivot bar 48 such as by providing a plurality of parallel aligned apertures as at 80 (FIG. 1) in the side beams 32 and 34 of the inner frame 14. Other suitable means for shifting the position of the inner frame 14 with respect to the outer frame 12 of course will be readily apparent to those skilled in the art. By appropriately selecting the weight that is positioned over the rear end of the inner frame 14, compensation is provided for the forces tending to cause the side beams 22 and 24 of the outer frame 12 to bow downwardly.

Subsequent to the positioning of a load on the trailer frame 10, the transverse beam 56 may be secured at its outer ends to the under surfaces 60 and 62 of the side beams of the outer frame 12. Additionally, the upwardly directed force imparted to the side beams 22 and 24 may be amplified by appropriately adjusting the bolt 72 on the attaching means 68 and the corresponding bolt on the attaching means 70 where the side beams 32 and 34 of the inner frame 14 are constructed from a material having an inherent resilience. It is necessary, however, that the side beams 32 and 34 be constructed from substantially rigid materials so as to effectively transmit the weight of the load 78. In the embodiment illustrated, the respective beams of both the inner and outer frames 12 and 14 are constructed with steel I-beams that are conventionally used in trailer frame structures.

What is claimed is:

1. A trailer structure for supporting a load comprising a first elongated frame member including substantially parallel spaced side beams extending from the front end of said first frame member to the rear end thereof, coupling means at said front end of said first frame member for coupling said trailer to a vehicle, a second elongated frame member including substantially parallel spaced side beams and having a front and a rear end, said second frame member being attached intermediate its ends to said first frame member adjacent said rear end of said first frame member for pivotal movement about a generally horizontal axis relative to said first frame member, said front end of said second frame member having means for engaging said side beams of said first frame member at substantially parallel points intermediate the ends of said first frame member so that, when said second frame member pivots about said axis in response to the weight of a load supported by said rear end of said second frame member, said engaging means on said front end of said second frame member and transmit an upwardly directed force thereto proportional to the weight of the load, said trailer structure further comprising a wheel assembly attached to one of said frame members proximate to said pivot axis, said means for engaging said side beams of said first frame member comprising a rigid beam connected to said front end of said second frame member and extending generally transverse to said side beams of said second frame member.

2. The trailer structure as claimed in claim 1 wherein said first and second frame members are substantially rectangularly shaped with the perpendicular distance between said side beams of said first frame member being such that said second frame member is positionable between said side beams of said first frame member.

3. The trailer structure as claimed in claim 1 wherein said second frame member is selectively positionable transversely of said axis.

4. The trailer structure as claimed in claim 1 wherein said side beams of said first frame member have downwardly facing surface portions and said rigid beam on said front end of said second frame member has laterally spaced upwardly facing surface portions for contacting respectively said surface portions on said side beams of said first frame member.

5. The trailer structure as claimed in claim 4 wherein means are provided for detachably connecting said respective surface portions subsequent to the positioning of a load on said trailer structure.

6. A trailer structure for supporting a load comprising a first elongated frame member including substantially parallel spaced side beams extending from the front end of said first frame member to the rear end thereof, coupling means at said front end of said first frame member for coupling said trailer to a vehicle, a second elongated frame member including substantially parallel spaced side beams and having a front and a rear end, said second frame member being attached intermediate its ends to said first frame member for pivotal movement about a generally horizontal axis relative to said first frame member, said front end of said second frame member having means for engaging said side beams of said first frame member at substantially parallel points intermediate the ends of said first frame member so that, when said second frame member pivots about said axis in response to the weight of a load supported by said rear end of said second frame member, said engaging means on said front end of said second frame member will contact said side beams of said first frame member and transmit an upwardly directed force thereto proportional to the weight of the load, said trailer structure further comprising a wheel assembly attached to one of said frame members proximate to said pivot axis, said second frame member being selectively positionable transversely of said axis.

* * * * *